US007513049B2

(12) United States Patent
Williams

(10) Patent No.: US 7,513,049 B2
(45) Date of Patent: Apr. 7, 2009

(54) CARPENTRY MARKING TOOL

(76) Inventor: Gary E. Williams, 1505 SW. Cherokee Strip, Blue Springs, MO (US) 64015

( * ) Notice: Subject to any disclaimer, the term of this patent is extended or adjusted under 35 U.S.C. 154(b) by 0 days.

(21) Appl. No.: 12/002,007

(22) Filed: Dec. 14, 2007

(65) Prior Publication Data

US 2008/0163501 A1 Jul. 10, 2008

Related U.S. Application Data

(60) Provisional application No. 60/879,125, filed on Jan. 8, 2007.

(51) Int. Cl.
*G01B 5/14* (2006.01)
*G01B 3/30* (2006.01)
*E04F 21/00* (2006.01)

(52) U.S. Cl. ........................ 33/42; 33/41.1; 33/501.45; 33/194; 33/562; 33/567

(58) Field of Classification Search .................... 33/42, 33/41.1, 41.6, 44, 194, 562, 566, 492, 501.05, 33/501.08, 501.09, 501.45, 567
See application file for complete search history.

(56) References Cited

U.S. PATENT DOCUMENTS

| | | | | | |
|---|---|---|---|---|---|
| 924,877 | A * | 6/1909 | Banfill | ........................ | 33/566 |
| 1,143,426 | A * | 6/1915 | Miller | ........................ | 33/42 |
| 1,257,683 | A * | 2/1918 | Defenbaugh | ................ | 33/480 |
| 1,732,906 | A | 10/1929 | Morton | | |
| 2,328,678 | A | 9/1943 | Roos | | |
| 2,450,769 | A * | 10/1948 | Rothblum | ...................... | 33/42 |
| 2,473,639 | A * | 6/1949 | Erickson | ........................ | 33/42 |
| 2,509,164 | A * | 5/1950 | Nath | ........................ | 33/41.1 |
| 2,536,401 | A * | 1/1951 | Victor | ........................ | 33/567 |
| 2,729,895 | A * | 1/1956 | Backstrom | .................. | 33/197 |
| 3,201,873 | A * | 8/1965 | Bell et al. | ..................... | 33/562 |
| 4,584,774 | A * | 4/1986 | Link | .......................... | 33/633 |
| 5,038,483 | A | 8/1991 | Witek | | |
| 5,203,090 | A | 4/1993 | Bouska et al. | | |
| 5,604,988 | A | 2/1997 | Costelloe | | |
| 5,737,844 | A | 4/1998 | Brumley | | |
| 6,532,674 | B2 | 3/2003 | Farese | | |
| 6,637,121 | B2 * | 10/2003 | Barefoot | ................. | 33/501.45 |
| 6,807,777 | B2 | 10/2004 | Wagner et al. | | |
| 6,901,672 | B1 | 6/2005 | Reilly | | |
| 7,240,435 | B1 * | 7/2007 | Dowdakin | .................. | 33/194 |
| 2005/0022397 | A1 * | 2/2005 | Neblo | ........................ | 33/194 |

* cited by examiner

*Primary Examiner*—Christopher W Fulton
(74) *Attorney, Agent, or Firm*—John C. McMahon

(57) ABSTRACT

A marking tool comprising bottom, base and top polyhedral shaped portions integrally joined such that the top and bottom portions are skewed with respect to each other and the base, such that a plurality of selected spaced distances are defined between adjacent walls of the top and bottom portions relative to walls of the base portion.

4 Claims, 2 Drawing Sheets

CARPENTRY MARKING TOOL

CROSS REFERENCE TO RELATED APPLICATIONS

This application claims the benefit of U.S. Provisional Application No. 60/879,125 filed Jan. 8, 2007.

BACKGROUND OF THE INVENTION

The present invention is directed to a tool for allowing a carpenter or other craftsmen to quickly and accurately mark distances from an edge and, in particular to a marking block having a base with a polyhedral shape and smaller top and bottom portions having the same polyhedral shape but of a smaller size and offset with respect to the base.

Carpenters, such as cabinet makers, must make frequent and accurate dimensional measurements to provide a guide as to where to make a cut with a saw, where to drill, where to place pulls or handles and the like. Many of these measurements are in the range of one sixteenth of an inch to one inch in one sixteenth with increments in the American system using inches or in one tenth of a centimeter increments in systems using the metric system.

It is often difficult to accurately measure such short and precise measurements with a tape measure or rule and when using such a device, multiple marks must be made and a line drawn between them to provide a guide line. Further, prior art measuring devices, such as tape measures and rulers with positioning slides, are often difficult to uniformly position or to use in getting highly repetitive and accurate measurements.

Consequently, it is desirable to have a tool that allows a carpenter to very quickly and easily position a guide line or mark, a desired distance from the edge of a board or other material being worked.

SUMMARY OF THE INVENTION

A carpentry marking block that includes three preferably integrally joined portions, including a central or base portion, a top portion and a bottom portion that are stacked or positioned on top of one another.

The central portion has a polyhedral cross section with uniform wall lengths and a uniform height. The polyhedral cross section is chosen with respect to the particular system of measurement to be used. In the United States the polyhedral cross section will normally be chosen to be octagonal which provides sixteen measurements of a given incremental increase relative to each other. However, if only measurements in one eight increments are desired, the center portion may be square or, if measurements in one thirty second of an inch increments are required, the center portion may be hexadecahedral (16 sided). Furthermore, if a device is desired for use with the metric system, a pentahedral shape may be utilized.

The top portion and lower portion are each of uniform height and have a cross section that has the same shape (that is, for example, octagonal of uniform side length), as the central portion, but is smaller in maximum width as compared to the central section. For example, if the central portion has a maximum width of nine inches, is octagonal, and the measurements to be made by the tool are to be in one sixteenth inch increments, then the top portion is one inch shorter in width than the base portion or eight inches and the bottom portion is one and one eight inches shorter in width or seven and seven eights inches.

Furthermore, the top portion is positioned so as to have a first edge one sixteenth of an inch from one of the center portion edges and a second adjacent edge at three sixteenths of an inch from the next center portion edge. This positions all of the distances between the edges of the top portion and center portion at distances sequentially of 1/16, 3/16, 7/16, 11/16, 15/16, 13/16, 9/16 and 5/16 of an inch from one another. The bottom portion is positioned so that one edge of the bottom portion is one eight of an inch from one edge of the center portion with the next adjacent edge of the bottom portion being one fourth of an inch from the corresponding center portion edge. This provides spacing sequentially of 1/8, 1/4, 1/2, 3/4, 7/8, 5/8 and 3/8 of an inch between sides of the top and base portion. Preferably, the tool is constructed from a single integral block of high quality plastic, aluminum, magnesium, wood or other suitable material; however, it is also foreseen that the tool portions can be constructed separately and fixedly joined together by glueing, using screws or the like.

In use a dimension that a carpenter wishes to mark from an edge of a work piece is selected and an associated outer wall of either the top or bottom portions that is associated with the selected dimension is abutted against the edge from which the measurement is to be made. The associated outer wall of the center portion is then located at the appropriate distance which can be marked with a pencil, stylus or the like.

OBJECTS AND ADVANTAGES OF THE INVENTION

Therefore, the objects of the invention are: to provide a carpentry marking tool that allows a user to quickly and very accurately position a line or mark a desired distance from an edge of a board or other structural component; to provide such a tool having a center or base and smaller top and bottom portions all having a uniform polyhedral shape wherein the top and bottom portions are offset with respect to the base and each other, such that each edge of the top and bottom portions is a specific and different distance from a corresponding base edge; to provide such a tool that is easy to use, inexpensive to produce and especially well adapted for the intended use thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

Figure 1:
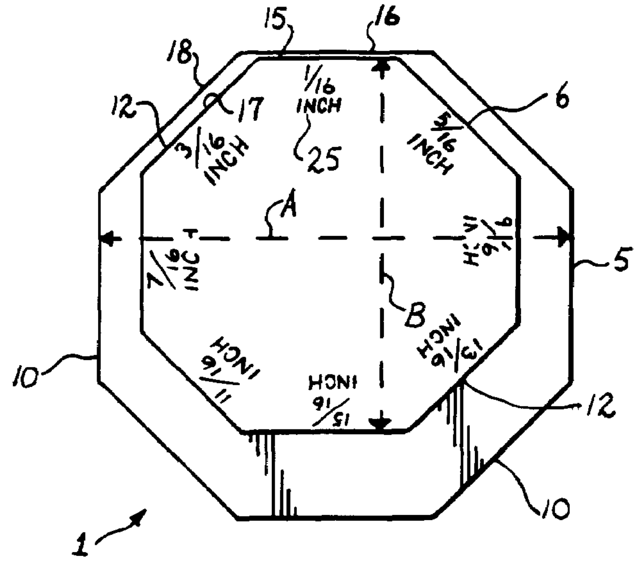
FIG. 1 is a top plan view of a marking tool in accordance with the invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Shown in the drawings is a marking tool generally designated by the reference numeral 1. The tool 1 indicates a central, middle or base portion 5, a top portion 6 and a bottom portion 7.

The base portion 5 is of uniform height throughout and has an octagonal cross section (in a horizontal plane) that has eight uniform side surfaces 10. The base portion 5 has a maximum width that is indicated by dimensional arrow identified by the letter A.

The top portion 6 is also of uniform height throughout and has an octagonal cross section that has eight uniform side surfaces 12. The top portion has a maximum width that is indicated by the dimensional arrow identified by the letter B. The dimension B is less then the dimension A. In the illustrated embodiment the tool 1 is designed to allow a user to measure in one sixteenth inch increments. As is seen, the top portion 6 is skewed (that is, not centered) relative to the base portion 5. A first side wall 15 of the top portion is spaced one sixteenth of an inch from a first side wall 16 of the base portion 5. A second side wall 17 of the top portion is spaced three sixteenth of an inch from a second side wall 18 of the base portion. Progressing around the tool 1, the walls are sequently spaced seven sixteenths, eleven sixteenths, fifteen sixteenths, thirteen sixteenths, nine sixteenths and five sixteenths of an inch apart all of which are set in position by placement of two adjoining walls 15 and 17, as the top portion width B is one inch less then the base portion width A.

Figure 3:
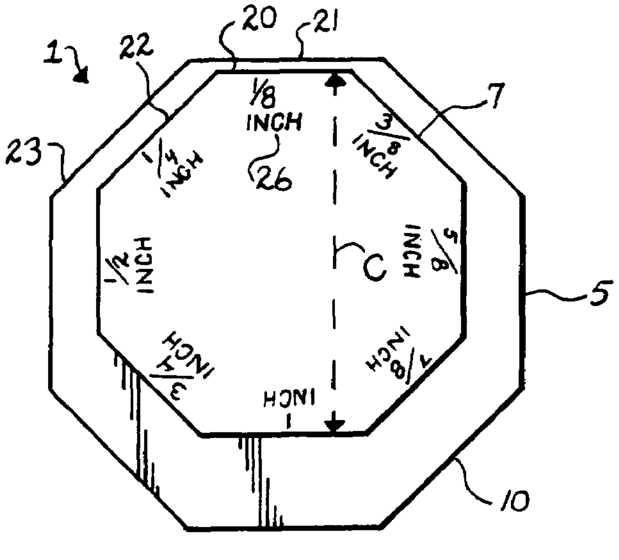
FIG. 3 is a bottom plan view of the tool.
Figure 4:
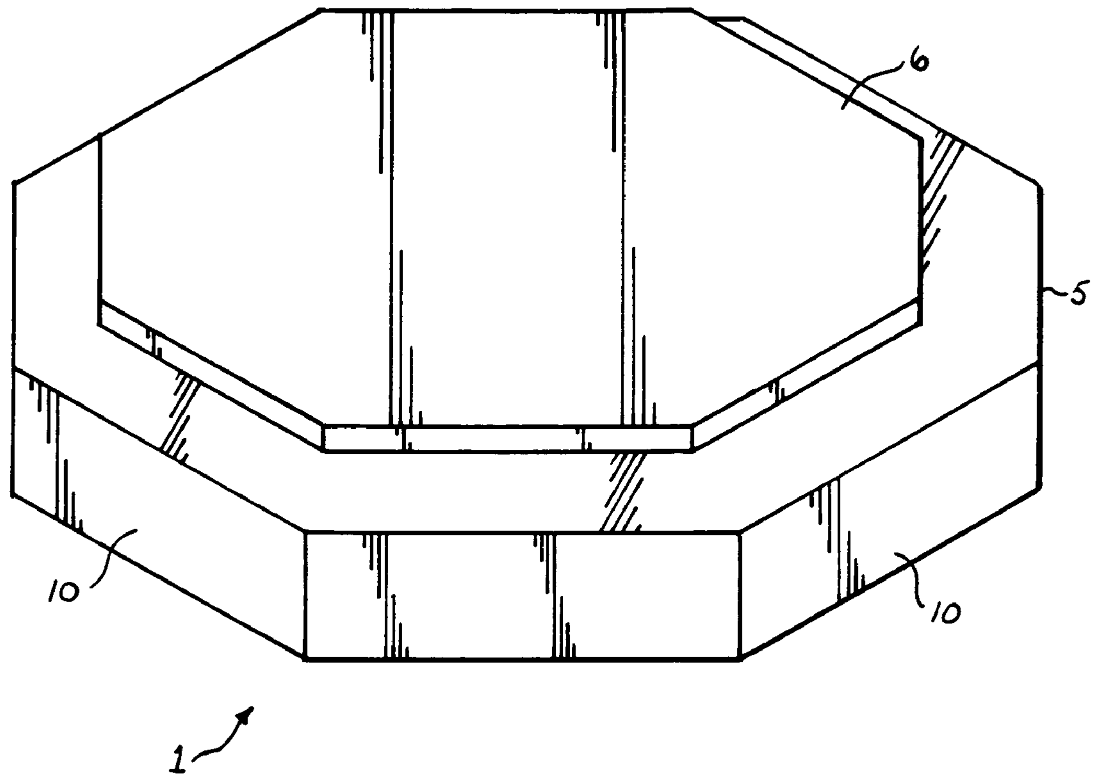
FIG. 4 is an enlarged perspective view of the tool.

The bottom portion 7 (see FIG. 3) is similarly skewed, but slightly different in that the bottom portion 7 has a maximum width indicted by the reference arrow that is identified by the arrow C that is one and one eighth inch less than base width A. One side 20 of the bottom portion 7 is spaced one eight of one inch from one side 21 of the base 5. A second adjacent side 22 of the bottom portion 7 is spaced one fourth of an inch from an adjacent side surface 23 of the base portion. Subsequent side spacings are one half, three fourths, seven eighths, five eighths and three eighths inches. Visual indicia 25 and 26 are preferably applied to visible sides of the top portion 6 and bottom portion 7 adjacent the corresponding spacing to provide a user with a visual indication of the width of the spacing.

Figure 2:
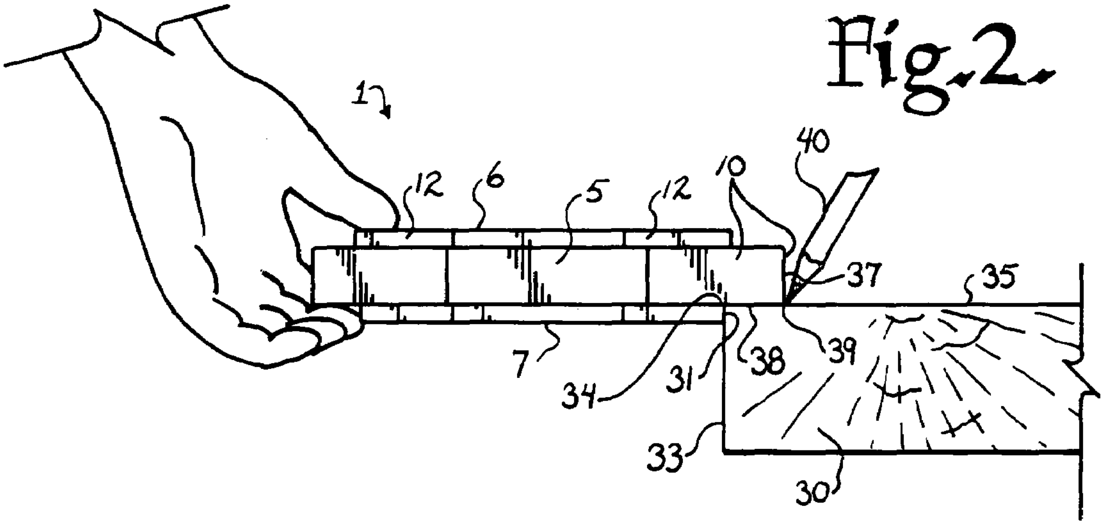
FIG. 2 is a side elevational view of the tool shown being used to mark a dimension on a board using a pencil.

Shown in FIG. 2 is the tool 1 being utilized to mark a board 30. In particular, a selected wall 31 of the bottom portion 7 is abutted against a side 33 of the board 30 that meets with a top 35 of the board 30 at an edge 34. The base portion 5 then has a wall 37 that is spaced from the wall 31 the length of a base surface 38 and provides an edge 39 in engagement with the board surface 35. The user then marks along the edge 39 with a pencil 40 (as is shown) or similar instrument. If a long line is desired on the board 30, the tool 1 can be moved along the edge 34 in concert with the pencil 40, so as to mark the line.

It is to be understood that while certain forms of the present invention have been illustrated and described herein, it is not to be limited to the specific forms or arrangement of parts described and shown.

What is claimed and desired to be secured by Letters Patent is as follows:

1. A marking tool comprising:

a) a base portion having a uniform height and a polyhedral shape with sides of uniform length;

b) a portion affixed to a top said base portion and having the same polyhedral shape as said base portion; and c) a bottom portion affixed to a bottom of said base portion and having the same polyhedral shape as said base portion; said top and bottom portions being less in width than said base portion; said top and bottom portions being skewed with respect to said base portion and each other so as to provide a plurality of selected distances between the sides of the base portion relative to sides of both the top and bottom portions.

2. The tool according to claim 1 wherein:

a) said base, top and bottom portions are all integral with each other.

3. The tool according to claim 1 wherein said base portion is one inch wider than said top portion and one and one eight inch wider than said bottom portion.

4. The tool according to claim 3 wherein:

a) a first wall of said top portion is one sixteenths of an inch from a first wall of said base portion; and b) a first wall of said bottom portion is one eight of an inch from one wall of said base portion.

* * * * *